July 16, 1968

J. S. ECKERT 3,392,967

TROUGH-TYPE DISTRIBUTOR

Filed Dec. 20, 1965

INVENTOR.
JOHN S. ECKERT

BY

ATTORNEY

July 16, 1968

J. S. ECKERT 3,392,967

TROUGH-TYPE DISTRIBUTOR

Filed Dec. 20, 1965

INVENTOR.
JOHN S. ECKERT

BY

*Gordon C. Mack*

ATTORNEY

July 16, 1968

J. S. ECKERT 3,392,967

TROUGH-TYPE DISTRIBUTOR

Filed Dec. 20, 1965

INVENTOR.
JOHN S. ECKERT
BY
ATTORNEY

United States Patent Office 3,392,967
Patented July 16, 1968

3,392,967
TROUGH-TYPE DISTRIBUTOR
John S. Eckert, Silver Lake, Ohio, assignor, by mesne assignments, to U.S. Stoneware, Inc., a corporation of Massachusetts
Filed Dec. 20, 1965, Ser. No. 524,994
2 Claims. (Cl. 261—98)

ABSTRACT OF THE DISCLOSURE

A liquid distributor useful in liquid/gas contact apparatus having a liquid feed splitter, an array of troughs below the splitter and extending radially outwardly, gas risers in the troughs and pans with weep holes underneath the troughs and disposed below the gas risers.

---

This invention relates to a trough-type distributor and its operation.

The distributor is composed of troughs which extend from any usual type of splitter, the troughs usually being opposite one another. Gas risers with weir tops are scattered along the length of the troughs and the gas rises through these countercurrent to the flow of liquid down through them. Under each trough is a shallow pan that collects the liquid draining through the risers. Perforations in its bottom provide for wide-spread, relatively even distribution of the liquid when the quantity of liquid is relatively small, and when the quantity of liquid is relatively large the shallow pans overflow so that there is wide-spread, relatively even distribution at that time also.

The invention is further described in connection with the accompanying drawings, in which.

Figure 1:
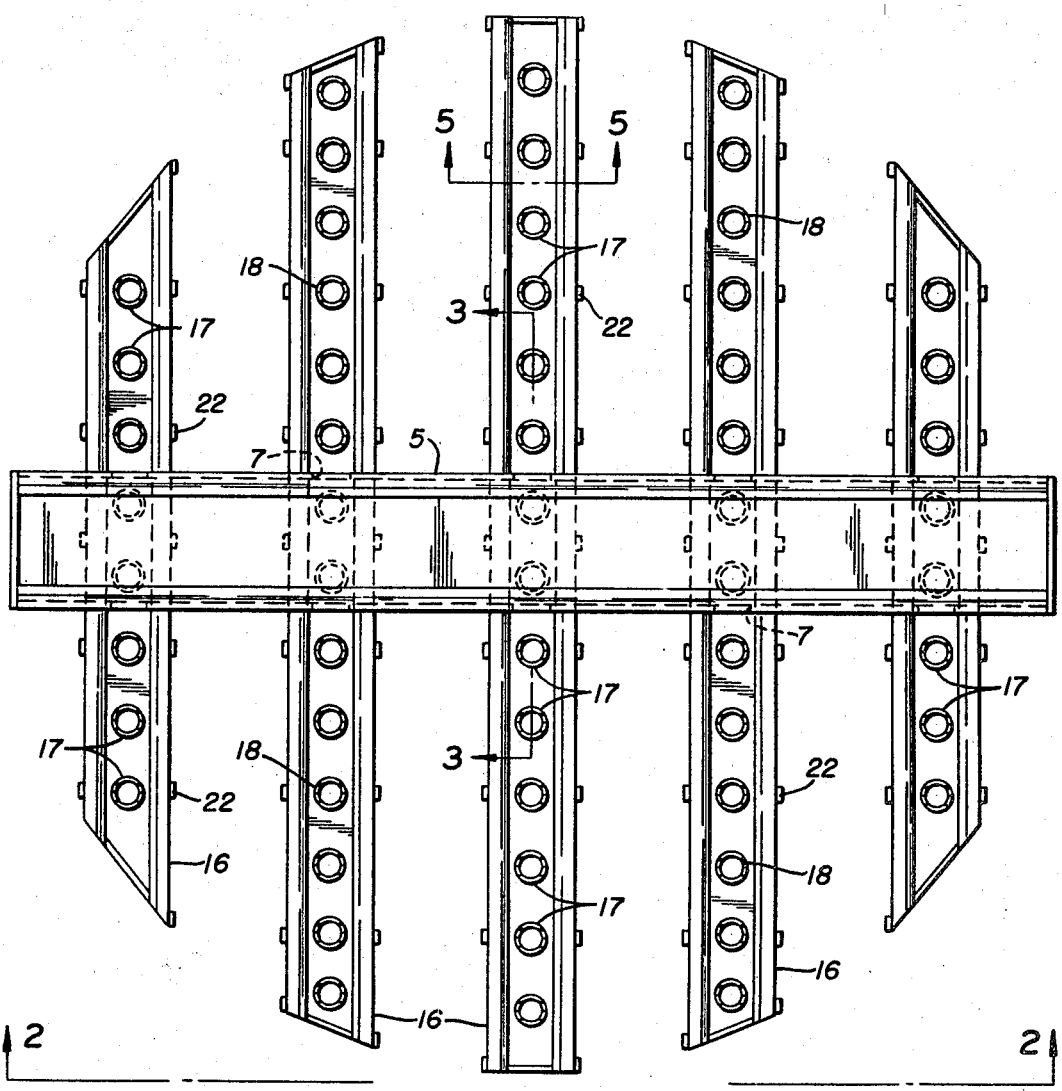
FIGURE 1 is a plan view of the distributor in a tower.
Figure 5:
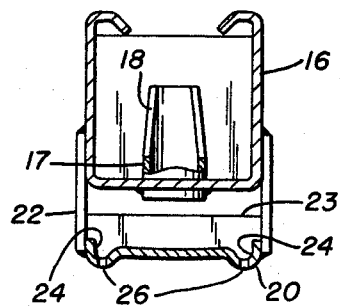
FIGURE 5 is a section through a trough of the distributor on the line 5—5 of FIGURE 1.
Figure 2:
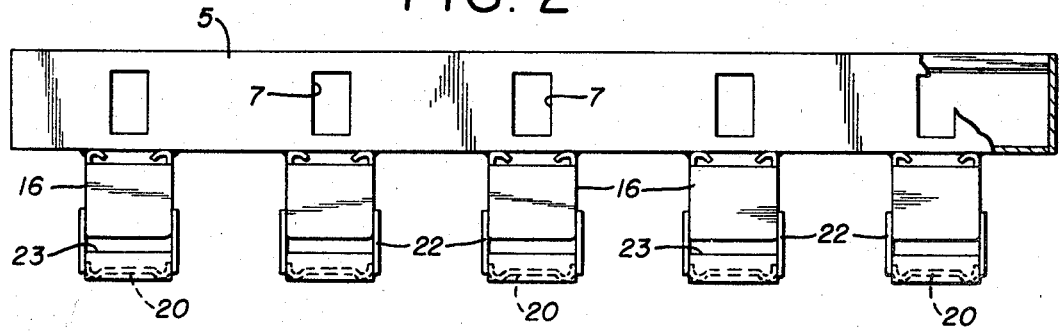
FIGURE 2 is an end view on the line 2—2 of FIGURE 1.
Figure 3:
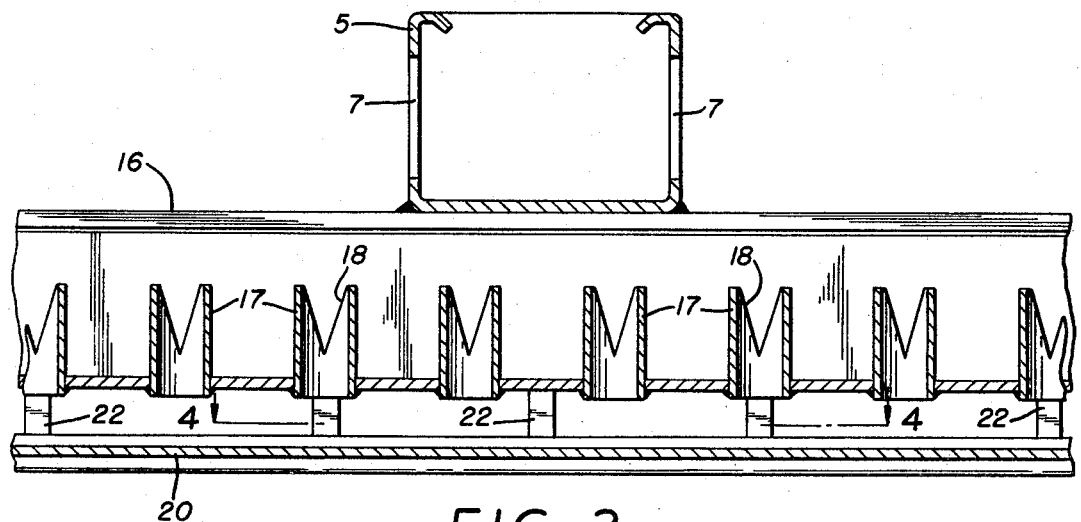
FIGURE 3 is an enlarged section on the line 3—3 of FIGURE 1.
Figure 4:
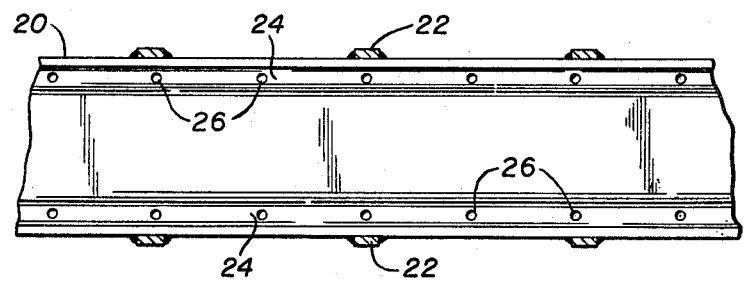
FIGURE 4 is a plan view of the pan on the line 4—4 of FIGURE 3.
Figure 6:
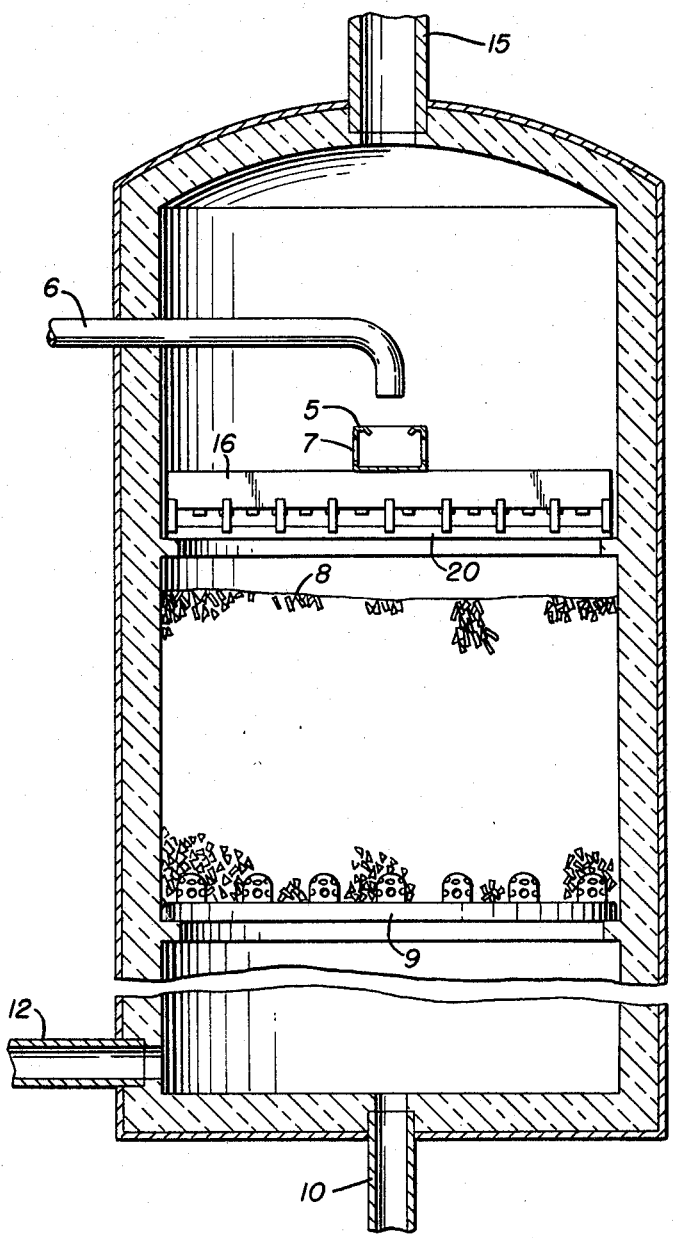
FIGURE 6 is a section through a tower with the distributor in it.

The splitter 5 may be of any usual construction. Liquid is supplied through any suitable inlet 6 and flows through side openings 7 into open troughs and thence onto the bed of packing elements 8 on support plate 9. The liquid drains through the one or more such beds in the tower and flows off through outlet 10. Gas entering at 12 passes up through the bed or beds and out through outlet 15.

The openings are at substantially the same level, although those over the longer troughs may be somewhat below those over the shorter troughs to insure relatively uniform distribution of the liquid. There are risers 17 throughout the length of each trough, usually with weir tops such as the V-weirs 18. Shallow pans 20 are located under the troughs, usually a single long pan under each trough. These pans are supported from the troughs by straps 22, and are closed at the ends by plates 23. The bottoms of the pans may be flat, but preferably there are shallow troughs 24 along each edge to insure uniform distribution of the liquid in the pans, and weep holes 26 for wide distribution of the liquid over the bed 8 if the amount of liquid is relatively small. When the amount of liquid is larger it overflows the walls of the pans and this also insures relatively uniform distribution. Thus, in this two-stage distribution system, there is relatively uniform distribution regardless of whether there is a larger or smaller amount of liquid flowing down through the tower.

The gases flow up around the distributor, and the gases flow over the sides of the pans 20 and up through the risers 18, giving relatively uniform upward flow of the gases through the entire cross section of the tower, which is particularly advantageous when there is a bed of packing elements above the distributor as well as below it.

Thus the liquid entering the splitter is first distributed into the troughs, and it is redistributed from the pans.

The invention is covered in the claims which follow.

What I claim is:

1. For use in a liquid/gas contact tower wherein liquid moving down the tower commingles with gas moving up the tower, a liquid distributor dimensioned to distribute liquid feed uniformly across substantially the entire cross-section of a contact tower, comprising liquid feed splitter means operative to receive liquid feed from a source and to divide the same into a plurality of liquid streams; an array of elongated troughs disposed beneath and extending radially outwardly of said splitter means to termini conforming generally with the periphery of a contact tower, said troughs being positioned to receive said plurality of streams emanating from said splitter means; a series of apertures distributed substantially uniformly along the bottoms of said troughs; a series of gas risers positioned in said troughs in correspondence with said apertures; and pan means having weep holes therethrough depending from said troughs and extending beneath said risers, whereby said streams received by said troughs are divided further by passage downwardly through said risers and onto said pan means, thence downwardly through the weep holes in said pan means.

2. The liquid distributor as defined in claim 1 wherein said gas risers are defined by cylindrical walls and each is provided with at least one weir to facilitate the passage of liquid therethrough.

References Cited

UNITED STATES PATENTS

| | | | |
|---|---|---|---|
| 756,327 | 4/1904 | Carkeek | 209—498 XR |
| 1,023,564 | 4/1912 | Hart | 261—108 |
| 1,100,971 | 6/1914 | Hambric | 209—498 XR |
| 1,602,844 | 10/1926 | Burhorn | 261—114 |
| 2,006,986 | 7/1935 | De Florez | 261—114 |
| 3,273,872 | 9/1966 | Eckert | 261—110 XR |

HARRY B. THORNTON, Primary Examiner.

FRANK W. LUTTER, TIM R. MILES, Examiners.

E. H. RENNER, Assistant Examiner.